United States Patent
Ainsworth

(10) Patent No.: US 7,029,736 B2
(45) Date of Patent: Apr. 18, 2006

(54) HOSE CONSTRUCTION CONTAINING THERMOPLASTIC FLUOROPOLYMER

(75) Inventor: Carol Lynn Ainsworth, Sun Prairie, WI (US)

(73) Assignee: The Goodyear Tire & Rubber Company, Akron, OH (US)

( * ) Notice: Subject to any disclaimer, the term of this patent is extended or adjusted under 35 U.S.C. 154(b) by 281 days.

(21) Appl. No.: 10/458,522

(22) Filed: Jun. 10, 2003

(65) Prior Publication Data

US 2004/0253403 A1    Dec. 16, 2004

(51) Int. Cl.
*B29D 22/00*    (2006.01)
*B29D 23/00*    (2006.01)
*B32B 1/08*     (2006.01)

(52) U.S. Cl. .................. 428/36.91; 428/421; 428/422; 138/141

(58) Field of Classification Search ............... 428/36.9, 428/36.91, 421, 422, 457, 423.9, 494, 492, 428/522; 138/137, 140, 141, 125, 126
See application file for complete search history.

(56) References Cited

U.S. PATENT DOCUMENTS

| | | | | |
|---|---|---|---|---|
| 5,588,469 A | * | 12/1996 | Kakiuchi et al. | 138/137 |
| 5,798,158 A | * | 8/1998 | Koike et al. | 428/36.9 |
| 6,242,548 B1 | | 6/2001 | Duchesne et al. | 526/255 |
| 6,261,657 B1 | | 7/2001 | Ainsworth et al. | 428/36.9 |
| 6,270,901 B1 | | 8/2001 | Parsonage et al. | 428/421 |
| 6,310,141 B1 | | 10/2001 | Chen et al. | 525/199 |
| 6,489,420 B1 | * | 12/2002 | Duchesne et al. | 526/255 |
| 6,849,314 B1 | * | 2/2005 | Jing et al. | 428/36.91 |

FOREIGN PATENT DOCUMENTS

EP    1 038 914    9/2000

OTHER PUBLICATIONS

European Search Report.
Derwent Publication Data Sheet for JP1247158, published Oct. 3, 1989.
Derwent Publication Data Sheet for JP62017486, published Jan. 26, 1987.
Derwent Publication Data Sheet for JP62084153, published Apr. 17, 1987.

* cited by examiner

*Primary Examiner*—Michael C. Miggins
(74) *Attorney, Agent, or Firm*—John D. DeLong

(57) ABSTRACT

The present invention relates to a hose construction containing a thermoplastic fluoropolymer barrier and an epichlorohydrin rubber layer. The hose comprises
(A) a rubber layer comprising
  (1) 100 parts by weight of elastomer comprising epichlorohydrin rubber; and
  (2) from about 10 to about 100 parts by weight, per 100 parts by weight of elastomer, of silica;
  wherein the rubber layer is cured with from about 0.1 to about 1.8 parts by weight, per 100 parts by weight of elastomer, of at least one peroxide;
(B) a barrier layer adjacent to the rubber layer, the barrier layer comprised of at least one thermoplastic fluoropolymer.

20 Claims, 1 Drawing Sheet

HOSE CONSTRUCTION CONTAINING THERMOPLASTIC FLUOROPOLYMER

BACKGROUND OF THE INVENTION

A major proportion of fuel hose presently employed in automobile applications is a multi-layered structure. The innermost tubular layer of the hose is formed of an elastomeric material intended to keep the fluid in the hose. Located between the inner core and the outer elastomeric cover is a barrier layer. In other fuel hoses, the barrier layer is the innermost tubular layer (known as a veneer hose), with the elastomeric material being located outside of such barrier layer. Many barrier layers have been used; however, many such compounds used in the barrier do not adhere to the conventional elastomeric material used in the innermost tubular layer. As a result of this problem, those skilled in the art conventionally use a layer between the inner core and the barrier layer which is both compatible to the elastomer used in the inner core and the barrier layer. Use of these "compatible" layers further adds to the cost and the resulting diameters of these fuel hose applications.

SUMMARY OF THE INVENTION

The present invention relates to a hose construction containing a fluoroplastic barrier and an epichlorohydrin rubber layer. The hose comprises
  (A) a rubber layer comprising
    (1) 100 parts by weight of elastomer comprising epichlorohydrin rubber; and
    (2) from about 10 to about 100 parts by weight, per 100 parts by weight of elastomer, of silica;
  wherein the rubber layer is cured with from about 0.1 to about 1.8 parts by weight, per 100 parts by weight of elastomer, of at least one peroxide;
  (B) a barrier layer adjacent to said rubber layer, said barrier layer comprised of at least one thermoplastic fluoropolymer.

DETAILED DESCRIPTION OF THE INVENTION

Figure 1:
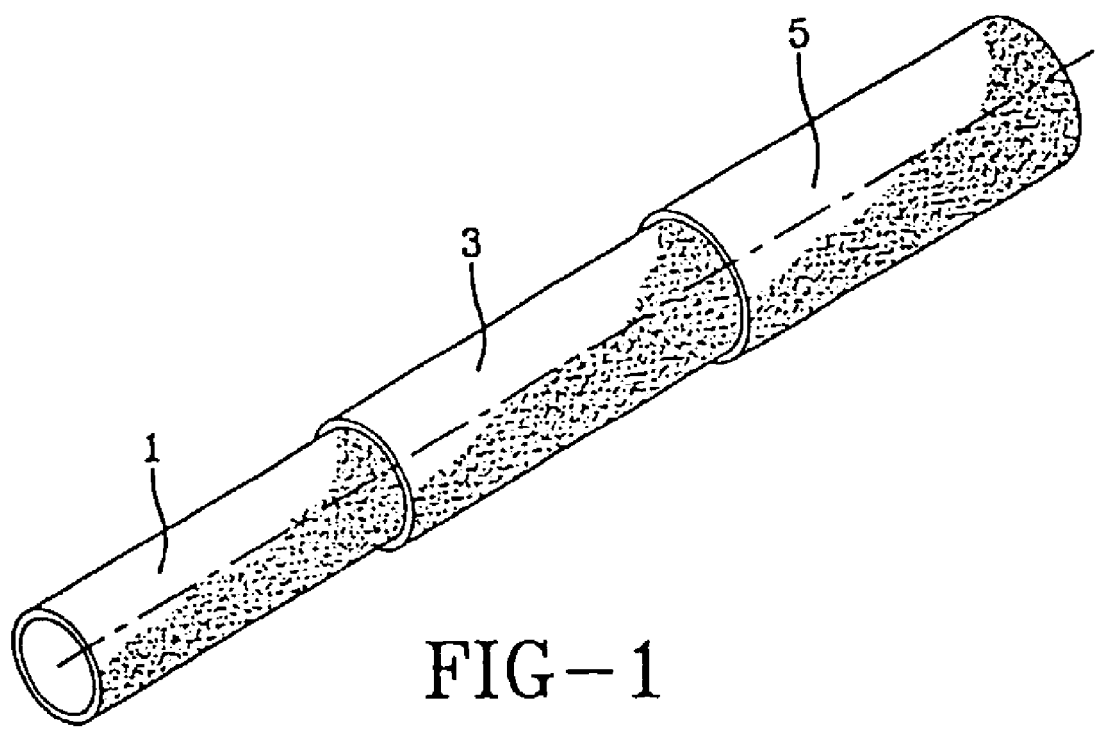
FIG. 1 is a perspective view of a hose according to the invention.

When a hose, for example, as shown in FIG. 1 is produced, the inner core (1) or tubular core of the present invention may be formed from epichlorohydrin (ECO) rubber. An embodiment where the inner core (1) is a barrier layer and the second layer 3 is of the hydrogenated ECO composition that is directly adhered thereto will be described later.

Epichlorohydrin rubber suitable for use includes (1) homopolymers of epichlorohydrin, (2) copolymers of an epiochlorohydrin with less than 30% of saturated epoxy monomers or with an unsaturated epoxy monomer, and (3) terpolymers of an epichlorohydrin with (a) less than 30% of a saturated epoxy monomer or mixtures thereof, (b) an unsaturated epoxy monomer or mixtures thereof, or (c) mixtures of (a) and (b). The epichlorohydrin polymers are prepared by polymerizing a monomeric epichlorohydrin alone or together with one or more of the aforementioned epoxy monomers with a suitable catalyst, such as an organometallic catalyst. For example, a reaction product of water with an alkyl aluminum compound is a suitable organometallic catalyst. Typical saturated epoxy monomers include alkylene oxides, such as ethylene oxide, and typical unsaturated epoxy monomers include allylglycidyl ether. The properties and the preparation of epichlorohydrin polymers suitable for use in the practice of this invention are known in the art and are described, for example, in U.S. Pat. No. 3,158,500, the disclosure of which is incorporated herein by reference.

Various epichlorohydrin rubbers may be used. In one embodiment, the epichlorohydrin rubber is of the series Hydrin T including Hydrin T3000 and Hydrin T3102. These modified epichlorohydrin rubbers may be copolymers but preferably are terpolymers of the epichlorohydrin monomer with allyl glycidal ether (AGE) and ethylene oxide. AGE is used to yield the copolymer or preferably with ethylene oxide to yield the terpolymer of epichlorohydrin. Preferably these modified epichlorohydrin rubbers contain from about 4 percent to about 12 percent AGE by weight and may contain from zero to 35 but preferably 15 or more percent ethylene oxide.

The epichlorohydrin rubber composition may include from about 10 to about 100 phr of silica. In another embodiment, the epichlorohydrin rubber composition includes from about 20 to about 80 phr of silica. The commonly employed siliceous pigments which may be used in the rubber composition include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, 532 EP etc; silicas available from Rhodia, with, for example, designations of Z1165MP and Z165GR and silicas available from Degussa AG with, for example, designations VN2 and VN3, etc.

The epichlorohydrin rubber composition can be crosslinked by at least one peroxide containing curing agents. Curing agents which may be employed in the compositions of the invention include, for example, di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy(2-ethyl hexanoate), 2,5-dimethyl-2,5-di(benzoylperoxy)-hexane, benzoyl peroxide, 2,5-dimethyl-2,5-(t-butyl peroxy)-hexane, 1,1-ditertbutyl peroxy-3,3,5-trimethyl cyclohexane, 4,4-ditert-butyl peroxy n-butyl valerate and n-butyl-4,4-bis(t-butyl peroxy) valerate. Additional curing agents which may be employed include diacyl or dialkyl peroxides such as α,α'-bis(t-butylperoxy)-diisopropylbenzene, 2,5-dimethyl-2,5-di(t-butylperoxy)hexane, di-t-butyl peroxide, 2,5-dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy(2-ethyl hexanoate), 2,5-dimethyl-2,5-di(benzoylperoxy)-hexane, benzoyl peroxide, and 1,1-di(t-butylperoxy)-3,3,5-trimethyl-cyclohexane. All of the above curing agents are commercially available.

In one embodiment, the epichlorohydrin rubber composition is cured with at least two peroxides. In one embodiment, the epichlorohydrin rubber composition may be cured with two or more of the above listed peroxides. In another embodiment, the epichlorohydrin rubber composition may be cured with one or more peroxides selected from 2,5-dimethyl-2,5-(t-butyl peroxy)-hexane, 1,1-ditert-butyl peroxy-3,3,5-trimethyl cyclohexane, n-butyl-4,4-bis(t-butyl peroxy)valerate, α,α'-bis(t-butylperoxy)-diisopropylbenzene, and 2,5-dimethyl-2,5-di-(t-butylperoxy)hexyne-3. In another embodiment, α,α'-bis(t-butylperoxy)-diisopropylbenzene may be used along with a second peroxide selected from 2,5-dimethyl-2,5-(t-butyl peroxy)-hexane, 1,1-ditert-butyl peroxy-3,3,5-trimethyl cyclohexane, n-butyl-4,4-bis(t-butyl peroxy)valerate, and 2,5-dimethyl-2,5-di-(t-butylperoxy)hexyne-3. In another embodiment, α,α'-bis(t-butylperoxy)-diisopropylbenzene may be used with 2,5-dimethyl-2,5-di-(t-butylperoxy)hexyne-3.

In one embodiment, two or more peroxides are used together to obtain superior adhesion between the epichlorohydrin rubber layer and the thermoplastic fluoropolymer barrier layer. The two peroxides are chosen so as to have differing reactivity towards the epichlorohydrin rubber, one being less reactive at a given temperature and one being more reactive. For example, the reactivity may be characterized by a decomposition temperature, defined as the temperature to give a decomposition half life of 10 hours, or the 10 hr T½. The reactivity is also related to the percent active oxygen content of the peroxide preparation used, which depends both on the chemical structure of the peroxide and on the presence of any inert carriers for the peroxide. The following table illustrates the relative reactivities of several commercially available peroxides.

| Peroxide | 10 hr T1/2, ° C. | % Active Oxygen (by weight) |
|---|---|---|
| Luperox 231[1] | 96 | 4.13–4.34 |
| Luperox 230[2] | 109 | 3.78–4.0 |
| VulCup 40KE[3] | 119 | 3.74–3.93 |
| Luperox 101[4] | 120 | 4.96–5.29 |
| Luperox 130[5] | 131 | 5.03–5.36 |

[1]1,1-ditert-butyl peroxy-3,3,5-trimethyl cyclohexane
[2]n-butyl-4,4-bis(t-butyl peroxy) valerate
[3]α,α'-bis(t-butylperoxy)-diisopropylbenzene
[4]2,5-dimethyl-2,5-(t-butyl peroxy)-hexane
[5]2,5-dimethyl-2,5-di-(t-butylperoxy)hexyne-3

In one embodiment, the epichlorohydrin rubber composition contains at least two peroxides as first and second peroxides. The first peroxide has a 10 hour decomposition temperature that is greater than that of the second peroxide. In one embodiment, the first peroxide has a 10 hour decomposition temperature that is at least 3° C. greater than that of the second peroxide.

The amount of peroxide curing agents that is used may vary. In one embodiment, the total amount of peroxides will range of from 0.1 to 1.8 phr (based on active parts of peroxide). Preferably, the level ranges from 0.2 to 1.5 phr. In one embodiment, the first peroxide and second peroxide are present such that the weight ratio of the first peroxide to the second peroxide is greater than 1. In another embodiment, the weight ratio of the first peroxide to the second peroxide ranges from about 1 to about 3. In another embodiment, the weight ratio of the first peroxide to the second peroxide ranges from about 1.5 to about 2.5.

In addition to the above, the epichlorohydrin rubber composition may contain other conventional additives including reinforcing agents, fillers, curatives, acid acceptors, plasticizers, antiozonants, antioxidants, processing aids, and the like, or are as disclosed in *The Vanderbilt Rubber Handbook*, R. T. Vanderbilt Co., 13th Edition (1990).

Crosslinking co-agents may be added to the epichlorohydrin rubber composition. Representative examples of such co-agents include triallyl cyanurate, triallyl isocyanurate, triallyl phosphate, triallyl trimellitate, diallylidene pentaerithryte, diallyl terephthalate, tetraallyl oxyethane, triallyl citrate, acetyl triallyl oxyethane, acetyl triallyl citrate, di-, tri-, tetra- and penta-functional acrylates, di-, tri-, tetra- and penta-functional methacrylates, n,n'-m-phenylene-dimaleimide, 1,2-cis-polybutadiene and mixtures thereof. Typical amounts of such co-agents range from 0.1 to 5 phr. Preferred ranges of co-agents include of from 0.3 to 3 phr.

Acid acceptors may be included in the epichlorohydrin rubber composition, including but not limited to magnesium oxide, magnesium hydroxide, calcium hydroxide, litharge, dibasic lead phosphite, calcium oxide, zinc oxide, hydrotalcites and tricalcium aluminate hexahydrate. Typical amounts of acid acceptors are about 1 to about 15 phr.

The epichlorohydrin rubber composition may include carbon black. Representative of reinforcing agents include carbon black, which is typically added in amounts ranging from about 10 to 100 parts by weight based on 100 parts by weight of total rubber (phr). Preferably, carbon black is used in amounts ranging from about 35 to 80 phr. Typical carbon blacks that are used include N110, N326, N330, N332, N472, N550, N630, N642, N650, N762, N770, N907, N908, N990 and N991. In those instances, when the hose will be used to convey flammable fluids, electrically conductive blacks may be used.

Other fillers which may be used include talc, clay, calcium carbonate, and the like. Other fillers may be used in an amount ranging from about 10 to 100 phr. Oil dispersions containing such fillers may also be used.

The epichlorohydrin rubber may include an organophosphonium salt. The organophosphonium salts include quaternary phosphonium salts containing an alkyl substituted group having 1 to 20 carbon atoms and quaternary phosphonium salts containing an aromatic substituent group, such as tetrabutylphosphonium chloride, allyltributylphosphonium chloride, tetrabutylphosphonium bromide, tributyl (methoxypropyl)phosphonium chloride, benzyltriphenylphosphonium chloride, benzyltrioctylphosphonium chloride, tetraalkylphosphonium benzotriazole (tetrabutylphosphonium benzotriazole, trioctylethylphosphonium benzotriazole), etc. One example of an organophosphonium salt is sold under the designation Dynamar™ FX-5166 and produced by 3M and composed mainly of allyltributyl phosphonium chloride.

The organophosphonium salt may be present in a range of amounts. Generally speaking, the amount of the organophosphonium salt will range from 0.1 to 10 phr (parts by weight per 100 parts by weight of rubber).

The mixing of the rubber composition can be accomplished by methods known to those having skill in the rubber mixing art. For example, the ingredients may be mixed in one stage but are typically mixed in at least two stages, namely at least one non-productive stage followed by a productive mix stage. The final curatives including vulcanizing agents are typically mixed in the final stage which is conventionally called the "productive" mix stage in which the mixing typically occurs at a temperature, or ultimate temperature, lower than the mix temperature(s) than the preceding non-productive mix stage(s).

Curing of the rubber composition is generally carried out at conventional temperatures ranging from about 160° C. to 190° C. Preferably, the curing is conducted at temperatures ranging from about 170° C. to 180° C.

Referring to FIG. 1, the inner core 1 may be of the above-described epichlorohydrin rubber with the barrier layer 3 directly adhered thereto.

In accordance with another embodiment, the barrier layer 1 may be the inner core with a rubber layer 3 of the epichlorohydrin rubber composition directly adhered thereto.

The layer of epichlorohydrin rubber may be formed by extrusion methods known to those skilled in the art. The thickness of this layer whether the inner core 1 or next layer 3 core 1 is important as excessively thin wall thicknesses or excessively thick wall thicknesses present flexibility or kinking problems or coupling compatibility problems of the final hose composite. It is believed that the inside diameter of the inner core (1) whether made from the epichlorohydrin rubber or barrier layer should range from 3 mm to 100 mm. Preferably, the inside diameter of the inner core will range from 4 mm to 75 mm. When the inner core is made from the epichlorohydrin rubber, the wall thicknesses of the inner core (1) should range from 0.1 mm to 8.0 mm, with a range of from 0.5 mm to 4.0 mm being preferred. When the inner core is made from the barrier layer compound, the wall thicknesses of the inner core (1) should range from 0.02 to 0.76 mm.

One advantage of the present invention is that the layer of epichlorohydrin rubber may be directly adhered to the barrier layer used in the present invention. Accordingly, no "compatible" polymeric layer need be present between the inner core (1) and the barrier layer (3) of the present invention.

The barrier layer (1) or (3) used in the present invention is derived from a terpolymer derived from tetrafluoroethylene, hexafluoropropylene and vinylidene fluoride, or a quadpolymer comprising tetrafluoroethylene, hexafluoropropylene, vinylidene fluoride, and a perfluorovinyl ether. The thickness of this barrier layer (3) is important, as excessively thin wall thicknesses or excessively thick wall thicknesses present flexibility or kinking problems or desired barrier properties. Generally speaking, the thickness of the barrier layer (3) will range from about 0.02 mm to about 0.76 mm with a range of from about 0.12 mm to 0.25 mm being preferred. The preferred terpolymers which may be used to form the barrier layer (3) of the hose of the present invention are commercially available from the 3M Company/Dyneon under the commercial designations THV 200, THV 300, THV 400 and THV 500. THV 500 has a melting range of from 165° C. to 180° C., a melt flow index of 5 to 15 (265° C./5 kilogram) as determined by ASTM 1238, a specific gravity of 1.98 grams per centimeter according to ASTM 792, a tensile of 20 N/square meters according to ASTM 638 and an elongation of 450 percent according to ASTM 638. Also suitable is THV X 815 G, reportedly a polymer derived from tetrafluoroethylene, hexafluoropropylene, vinylidene fluoride, and a perfluorovinyl ether. THV X 815 G has a melting point of 225° C. as determined by ASTM D4591, a melt flow index (265° C./5 kg) of 12 g/10 min. as determined by ASTM D1238, a specific gravity of 2.06 g/cc as determined by ASTM D792, tensile strength at break of 29 MPa as determined by ASTM D638, elongation at break of 430% as determined by ASTM D638, and a flexural modulus of 525 MPa as determined by ASTM D790.

Suitable fluorothermoplastics for use in the barrier layer include fluorothermoplastic quadpolymers, fluorothermoplastic terpolymers (THV), PTFE, and FEP, poly(ethylene-co-tetrafluoroethylene) (ETFE), poly(tetrafluoroethylene-co-propylene) (TFEP), poly(chlorotrifluoroethylene-co-ethylene) (ECTFE), and the terpolymer poly(ethylene-co-tetrafluoroethylene-co-hexafluoropropylene) (E/TFE/HFP). In one embodiment, the fluorothermoplastic in the barrier layer includes fluorothermoplastic quadpolymers or fluorothermoplastic terpolymers (THV).

Suitable thermoplastic quadpolymers are disclosed in U.S. Pat. No. 6,489,420, fully incorporated herein by reference. As disclosed therein, suitable thermoplastic quadpolymers are derived from i) tetrafluoroethylene, (ii) vinylidene fluoride, (iii) at least one ethylenically unsaturated monomer of the formula $CF_2=CFR_f$ where $R_f$ is a perfluoroalkyl or a perfluoroalkoxy of 1 to 8 carbon atoms, and (iv) a perfluorovinyl ether of the formula $CF_2=CF-(OCF_2\ CF(R_f))_a\ OR'_f$ where $R_f$ is as described in (iii), $R'_f$ is a perfluoroaliphatic, preferably a perfluoroalkyl or a perfluoroalkoxy, of 1 to 8, preferably 1 to 3, carbon atoms, and a has a value of 0 to 3. In one embodiment, suitable thermoplastic quadpolymers comprise (i) 40 to 80 weight percent (alternatively 45 to 76 weight percent) tetrafluoroethylene, (ii) 10 to 30 weight percent (alternatively 12 to 25 weight percent) vinylidene fluoride, (iii) 5 to 40 weight percent (alternatively from 10 to 30 weight percent) of a comonomer of the formula $CF_2=CFR_f$, and (iv) 0.1 to 15 weight percent (alternatively 1 to 10 weight percent) of the perfluorovinyl ether of the formula $CF_2=CF-(OCF_2\ CF(R_f))_a\ OR'_f$.

In an alternative embodiment, the thermoplastic quadpolymer contains interpolymerized units derived from TFE, VDF, HFP and the perfluorovinyl ether wherein the value of "a" is 0, 1 or 2.

In an alternative embodiment, the thermoplastic quadpolymer contains interpolymerized units derived from TFE, VDF, HFP and the perfluorovinyl ether is of the formulas PPVE1 or PPVE2:

$$CF_2=CFOCF_2CF_2CF_3 \qquad \text{PPVE1}$$

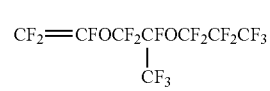

$$\underset{\underset{CF_3}{|}}{CF_2=CFOCF_2CFOCF_2CF_2CF_3} \qquad \text{PPVE2}$$

In one embodiment, the thermoplastic quadpolymer which may be used to form the barrier layer (3) of the hose of the present invention are commercially available from the Dyneon Company under the commercial designation THV X 815 G.

Also suitable for use in the barrier layer is a thermoplastic terpolymer derived from tetrafluoroethylene, hexafluoropropylene and vinylidene fluoride. Suitable thermoplastic terpolymer of tetrafluoroethylene, hexafluoropropylene and vinylidene fluoride may include about 30–75 weight percent tetrafluoroethylene, about 5–40 weight percent hexafluoropropylene and about 5–55 weight percent vinylidene fluoride, with 100 weight percent of the monomer weight of the terpolymer made up from the combination of tetrafluoroethylene, hexafluoropropylene and vinylidene fluoride. Suitable thermoplastic terpolymers have a melting point range of about 75° C. to about 275° C. In one embodiment, suitable thermoplastic terpolymers of tetrafluoroethylene, vinylidene fluoride, and hexafluoropropylene are available from Dyneon LLC and Dyneon GmbH as THV-200, 300, 400, 500, and 600 series.

It is often desirable to dissipate electrostatic charge that may develop in the use of the fuel hose. Electrostatically dissipative grades of a terpolymer of tetrafluoroethylene, hexafluoropropylene, vinylidene fluoride containing from 2 to 20 percent by weight of carbon black are disclosed for example in U.S. Pat. No. 6,242,548. An electrostatically dissipative grade of a terpolymer of tetrafluoroethylene, hexafluoropropylene, vinylidene fluoride is available commercially as THV 515 from Dyneon. In one embodiment, the barrier layer is a two layer construction comprising a first layer of an electrostatically dissipative grade of terpolymer of tetrafluoroethylene, hexafluoropropylene, vinylidene fluoride, and a second layer of a terpolymer derived from tetrafluoroethylene, hexafluoropropylene and vinylidene fluoride, or a quadpolymer comprising tetrafluoroethylene, hexafluoropropylene, vinylidene fluoride, and a perfluorovinyl ether. The two-part barrier layer may be fabricated using co-extrusion or other techniques as are known in the art. Constructed in this way, the barrier or utilizes the superior permeation resistance of the terpolymer derived from tetrafluoroethylene, hexafluoropropylene and vinylidene fluoride, or quadpolymer comprising tetrafluoroethylene, hexafluoropropylene, vinylidene fluoride, and a perfluorovinyl ether, and the dissipative character of the electrostatically dissipative grade of THV.

The hose may have an outer cover (5). This outer cover may be made from an elastomeric material or reinforcement. Examples of reinforcement include spiraled yarn, knitted yarn and braided yarn. Yarns of polyester, nylon, rayon and aramid may be used. When an elastomeric cover is desired, the cover (5) may be extruded over the underlying layer 3, or, as discussed below, various other optional layers. The elastomers which may be used to form the cover for the hose of the present invention include those known to those skilled in the art including but not limited to chlorosulfonated polyethylene, chlorinated polyethylene, acrylonitrile-butadiene rubber/PVC blends, epichlorohydrin, EPDM, chloroprene, EVA, ethylene acrylic elastomer "EA" and EVM. The thickness of the elastomeric cover (5) is obviously depends upon the desired properties of the hose and the elastomer that is used. Generally speaking, the thickness of the elastomeric cover (5) will range from about 0.1 mm to about 10 mm, with a range of from 0.5 mm to being 2.5 mm being preferred.

Figure 2:
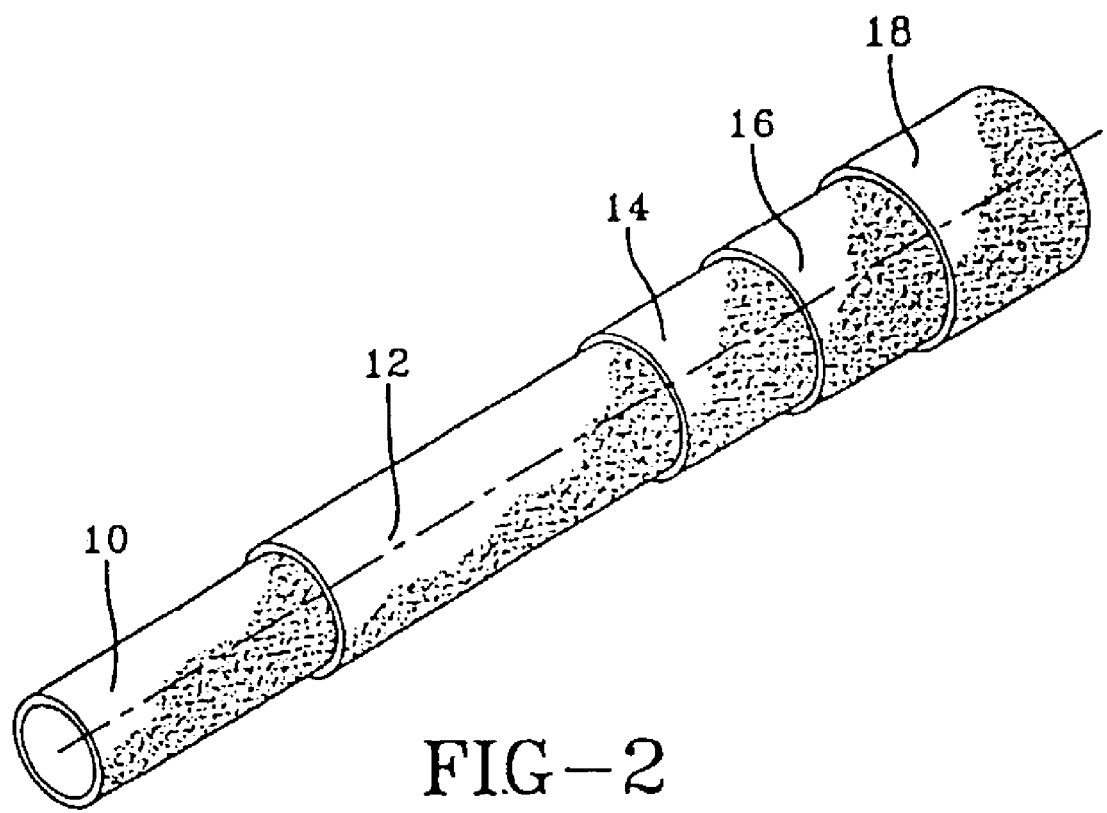
FIG. 2 is a perspective view of a hose according to the invention.

The present invention may have other features. For example, when a hose, as shown in FIG. 2, is produced having the inner core (10) and barrier layer (12), dispersed on the outside of the barrier layer (12) may be a first layer (14) of another polymer. Such polymer may be of the same composition as the inner core. In another embodiment, the polymer which is used in this first layer (14), which interfaces the barrier layer (12), may be epichlorohydrin. The thickness of this first layer (14) which interfaces the barrier layer (12) may range depending upon the polymer selected. Generally speaking, the thickness of this layer will range of from about 0.25 mm to about 1.5 mm with a range of from about 0.50 mm to about 1.0 mm being preferred.

Another optional feature of the present invention is reinforcement (16) may be added on top of the first layer (14) which interfaces with the barrier layer (12). Such reinforcement (16) is known to those skilled in the art and may consist of spiraled, knitted or braided yarn. Such reinforcements are typically derived from polyester, nylon, rayon or aramid cords. The reinforcement (16) is preferably spirally wound about the first layer under sufficient tension to improve the strength of the hose structure. The reinforcement layer (16) is preferably spirally wrapped at angles such that the flexing of the hose will not result in collapse or kinking. An angle such as from zero to 89.9° with respect to the centerline of the hose may be used. Most preferably, a neutral angle of 54° 73' or below is used for the spiral wraps.

In accordance with one embodiment, the inner core 10 functions as a barrier layer comprised of the above-described terpolymer, the next layer 12 is made of the epichlorohydrin rubber, the next layer 14 is omitted, with reinforcement 16 being directly against the rubber layer 12 followed by an outer cover 18.

As mentioned above, the elastomeric cover (18) is the outside layer.

The following examples are provided to illustrate the instant invention and are not intended to limit the same. All parts are parts by weight, unless listed otherwise.

EXAMPLE 1

In order to demonstrate the advantage of the present invention, a series of epichlorohydrin rubber samples were prepared. The recipes may be found in Table 1, with amounts expressed as parts by weight, along with their respective properties in Table 2. The original tensile and elongation properties were tested according to ASTM D412. The fluid agings were measured according to ASTM D471. The air agings were measured according to ASTM D573. Tear resistance was measured according to ASTM D624.

TABLE 1

| Sample | 1 | 2 | 3 | 4 | 5 | 6 | 7 |
|---|---|---|---|---|---|---|---|
| Epichlorohydrin Rubber[1] | 100 | 100 | 100 | 100 | 100 | 100 | 100 |
| Silica[2] | 0 | 0 | 0 | 35 | 35 | 35 | 35 |
| Carbon Black[3] | 50 | 60 | 70 | 40 | 40 | 60 | 60 |
| Plasticizers[4] | 10 | 10 | 10 | 10 | 10 | 10 | 10 |
| Potassium Stearate | 2.5 | 2.5 | 2.5 | 2.5 | 2.5 | 2.5 | 2.5 |
| Antidegradant[5] | 0.7 | 0.7 | 0.7 | 0.7 | 0.7 | 0.7 | 0.7 |
| Acid Acceptors[6] | 7.5 | 7.5 | 7.5 | 7.5 | 7.5 | 7.5 | 7.5 |
| Dynamar 5166 | 1.5 | 1.5 | 1.5 | 1.5 | 1.5 | 1.5 | 1.5 |
| Coagent[7] | 0.6 | 0.6 | 0.6 | 0.6 | 0.6 | 0.6 | 0.6 |
| Process aid[8] | 2.0 | 2.0 | 2.0 | 2.0 | 2.0 | 2.0 | 2.0 |
| Peroxide[9] | 0.8 | 0.8 | 0.8 | 0.8 | 0.4 | 0.8 | 0.4 |
| Peroxide[10] | 0.4 | 0.4 | 0.4 | 0.4 | 0.8 | 0.4 | 0.8 |

[1]Hydrin T3102, Zeon Chemicals
[2]Hi-Sil 532 EP
[3]N550 and N326
[4]Paraplex G50 and Plasticizer SC
[5]nickel carbamate type
[6]calcium and magnesium oxides
[7]triallyl isocyanurate
[8]VANFRE AP-2
[9]α,α'-bis(t-butylperoxy)-diisopropylbenzene, VUL-CUP 40KE
[10]2,5-dimethyl-2,5-di-(t-butylperoxy)hexyne-3, Luperox 130XL45

TABLE 2

| | | | | | | | |
|---|---|---|---|---|---|---|---|
| Mooney Scorch, ML(1 + 30) @ 125° C. | | | | | | | |
| Minimum Viscosity | 61 | 75 | 84 | 83 | 79 | 118 | 121 |
| T$_5$, (min) | 7.2 | 6.3 | 5.1 | 8.2 | 9.7 | 6.3 | 9.3 |
| T$_{35}$, (min) | 17.0 | 16.1 | 14.4 | 19.5 | 28.2 | 25.1 | 0.0 |
| ODR, 60 minutes @ 160° C., MICRO 100 cpm 3° arc 170° C. | | | | | | | |
| M$_L$, (lbf · in) | 17 | 19 | 21 | 18 | 16 | 20 | 20 |
| M$_H$, (lbf · in) | 47 | 51 | 55 | 46 | 42 | 55 | 53 |
| Ts$_2$, (min) | 2.1 | 2.6 | 2.5 | 2.8 | 2.9 | 2.3 | 2.7 |
| T'$_{90}$, (min) | 38.2 | 39.6 | 40.1 | 37.2 | 44.3 | 37.5 | 44.2 |
| Adhesion to Thermoplastic Fluoropolymer | | | | | | | |
| Adhesion to THV 500 | 1.0 | 1.0 | 2.0 | 8.0 | 10* | 7.0 | 13* |
| Adhesion to THV 815 | 0.0 | 0.0 | 0.0 | 17* | 17* | 17* | 17* |
| *stock tear | | | | | | | |
| Original Vulcanized, 60 minutes @ 160° C. | | | | | | | |
| Hardness A, (pts) | 54 | 59 | 65 | 60 | 59 | 70 | 74 |
| Modulus @ 10%, (psi) | 50 | 64 | 83 | 74 | 73 | 104 | 159 |
| Modulus @ 25%, (psi) | 100 | 122 | 149 | 122 | 113 | 195 | 242 |
| Modulus @ 50%, (psi) | 156 | 195 | 224 | 176 | 155 | 298 | 358 |
| Modulus @ 100%, (psi) | 289 | 351 | 415 | 295 | 253 | 507 | 558 |
| Modulus @ 200%, (psi) | 723 | 851 | 994 | 569 | 492 | 813 | 854 |
| Modulus @ 300%, (psi) | 1250 | 1385 | 1570 | 823 | 728 | 1052 | 1091 |
| Tensile, (psi) | 1825 | 1743 | 1794 | 1203 | 1134 | 1159 | 1132 |
| Elongation, (%) | 438 | 382 | 357 | 516 | 560 | 348 | 317 |
| Tear Strength | | | | | | | |
| Tear Strength, (ppi) | 197 | 198 | 202 | 206 | 230 | 194 | 200 |
| Compression Set, 22 hours @ 135° C., Plied Disc | | | | | | | |
| Set, (%) | 1 | 29 | 30 | 31 | 33 | 35 | 47 |
| Aged Vulcanized, AIR OVEN, 70 hours @ 125° C. | | | | | | | |
| Hardness A, (pts) | 59 | 66 | 72 | 70 | 68 | 81 | 84 |
| Hard Change A, (pts) | 5 | 7 | 7 | 10 | 9 | 11 | 10 |
| Modulus @ 10%, (psi) | 71 | 104 | 141 | 127 | 122 | 219 | 261 |
| Modulus @ 25%, (psi) | 120 | 167 | 217 | 184 | 169 | 341 | 364 |
| Modulus @ 50%, (psi) | 176 | 244 | 304 | 250 | 221 | 471 | 481 |
| Modulus @ 100%, (psi) | 311 | 417 | 506 | 388 | 331 | 660 | 662 |
| Modulus @ 200%, (psi) | 715 | 890 | 1046 | 678 | 578 | 834 | 825 |
| Modulus @ 300%, (psi) | 1202 | 1390 | 1553 | 901 | 782 | — | 1049 |
| Tensile, (psi) | 1846 | 1730 | 1648 | 1166 | 1035 | 1039 | 1055 |
| Tensile Change, (%) | 1 | −1 | −8 | −3 | −9 | −10 | −7 |
| Elongation, (%) | 458 | 385 | 339 | 457 | 500 | 297 | 299 |
| Elongation Change, (%) | 5 | 1 | −5 | −11 | −11 | −15 | −6 |
| Aged Vulcanized, AIR OVEN, 70 hours @ 135° C. | | | | | | | |
| Hardness A, (pts) | 59 | 67 | 73 | 72 | 70 | 83 | 84 |
| Hard Change A, (pts) | 5 | 8 | 8 | 12 | 11 | 13 | 10 |
| Modulus @ 10%, (psi) | 74 | 104 | 142 | 135 | 126 | 256 | 285 |
| Modulus @ 25%, (psi) | 120 | 170 | 218 | 201 | 181 | 383 | 401 |
| Modulus @ 50%, (psi) | 179 | 247 | 308 | 264 | 237 | 510 | 522 |
| Modulus @ 100%, (psi) | 311 | 414 | 495 | 401 | 352 | 672 | 685 |
| Modulus @ 200%, (psi) | 700 | 849 | 1013 | 696 | 589 | 840 | 837 |
| Modulus @ 300%, (psi) | 1162 | 1319 | 1506 | 911 | 776 | — | — |
| Tensile, (psi) | 1742 | 1626 | 1604 | 1110 | 984 | 1014 | 1003 |
| Tensile Change, (%) | −5 | −7 | −11 | −8 | −13 | −13 | −11 |
| Elongation, (%) | 444 | 381 | 323 | 443 | 462 | 280 | 271 |
| Elongation Change, (%) | 1 | 0 | −10 | −14 | −18 | −20 | −15 |

As can be seen from the adhesion data in Table 2, samples 4–7 containing silica in the epichlorohydrin rubber composition showing surprisingly and unexpectedly superior adhesion to THV 500 and THV 815 thermoplastic fluoropolymers, as compared with samples 1–3 containing no silica. Even more surprising and unexpected, adhesion was further improved by using a ratio of first to second peroxides of greater than 1 (Sample 5 vs Sample 4; Sample 7 vs Sample 6), where the first peroxide (Luperox 130) has a 10 hour decomposition temperature greater than the second peroxide (Vul-Cup 40KE).

What is claimed is:

1. A hose comprising
  (A) a rubber layer comprising
    (1) 100 parts by weight of elastomer comprising epichlorohydrin rubber; and
    (2) from about 10 to about 100 parts by weight, per 100 parts by weight of elastomer, of silica; and
    (3) from about 0.1 to about 1.8 parts by weight, per 100 parts by weight of elastomer, of at least one peroxide;
  (B) a barrier layer adjacent to said rubber layer, said barrier layer comprised of at least one thermoplastic fluoropolymer;

wherein said at least one peroxide comprises first and second peroxides, wherein the 10 hour decomposition temperature of the first peroxide is greater than the 10 hour decomposition temperature of the second peroxide.

2. The hose of claim 1, wherein said at least one peroxide comprises first and second peroxides, wherein the 10 hour decomposition temperature of the first peroxide is greater than the 10 hour decomposition temperature of the second peroxide and wherein the weight ratio of the first peroxide to the second peroxide is greater than 1.

3. The hose of claim 1, wherein said at least one peroxide comprises first and second peroxides, wherein the 10 hour decomposition temperature of the first peroxide is greater than the 10 hour decomposition temperature of the second peroxide and wherein the weight ratio of the first peroxide to the second peroxide ranges from about 1 to about 3.

4. The hose of claim 1, wherein said at least one peroxide comprises at least first and second peroxides, wherein the 10 hour decomposition temperature of the first peroxide is greater than the 10 hour decomposition temperature of the second peroxide and wherein the weight ratio of the first peroxide to the second peroxide ranges from about 1.5 to about 2.5.

5. The hose of claim 1, wherein the epichlorohydrin rubber is a terpolymer of epichlorohydrin monomer, allyl glycidyl ether and ethylene oxide.

6. The hose of claim 1, wherein the thermoplastic fluoropolymer is selected from the group consisting of: thermoplastic terpolymers derived from tetrafluoroethylene, hexafluoropropylene and vinylidene fluoride; and thermoplastic quadpolymers derived from tetrafluoroethylene, hexafluoropropylene, vinylidene fluoride, and a perfluorovinyl ether of formula PPVE1 or PPVE2:

PPVE1

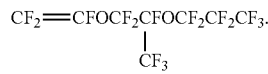

PPVE2

7. The hose of claim 1, wherein the thermoplastic fluoropolymer comprises a thermoplastic terpolymer of tetrafluoroethylene, hexafluoropropylene and vinylidene fluoride comprising about 30–75 weight percent tetrafluoroethylene, about 5–40 weight percent hexafluoropropylene and about 5–55 weight percent vinylidene fluoride, with 100 weight percent of the monomer weight of the terpolymer made up from the combination of tetrafluoroethylene, hexafluoropropylene and vinylidene fluoride.

8. The hose of claim 1 wherein the barrier layer comprises: a first layer of an electrodissipative thermoplastic fluoropolymer composition comprising carbon black, and a second layer of a thermoplastic fluoropolymer.

9. The hose of claim 1, wherein said at least one peroxide is selected from the group consisting of di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy(2-ethyl hexanoate), 2,5-dimethyl-2,5-di(benzoylperoxy)-hexane, benzoyl peroxide, 2,5-dimethyl-2,5-(t-butyl peroxy)-hexane, 1,1-ditert-butyl peroxy-3,3,5-trimethyl cyclohexane, 4,4-ditert-butyl peroxy n-butyl valerate and n-butyl-4,4-bis(t-butyl peroxy)valerate, diacyl or dialkyl peroxides such as α,α'-bis(t-butylperoxy)-diisopropylbenzene, 2,5-dimethyl-2,5-di(t-butylperoxy)hexane, di-t-butyl peroxide, 2,5-dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy(2-ethyl hexanoate), 2,5-dimethyl-2,5-di(benzoylperoxy)-hexane, benzoyl peroxide, and 1,1-di(t-butylperoxy)-3,3,5-trimethyl-cyclohexane.

10. The hose of claim 1 wherein said at least one peroxide is selected from the group consisting of 1,1-ditert-butyl peroxy-3,3,5-trimethyl cyclohexane; n-butyl-4,4-bis(t-butyl peroxy)valerate; α,α'-bis(t-butylperoxy)-diisopropylbenzene; 2,5-dimethyl-2,5-(t-butyl peroxy)-hexane; and 2,5-dimethyl-2,5-di-(t-butylperoxy)hexyne-3.

11. The hose of claim 1, wherein the first peroxide is 2,5-dimethyl-2,5-di-(t-butylperoxy)hexyne-3, and the second peroxide is α,α'-bis(t-butylperoxy)-diisopropylbenzene.

12. The hose of claim 1 wherein the barrier layer is the innermost layer of the hose.

13. The hose of claim 1, wherein the rubber layer further comprises from about 10 to about 100 parts by weight, per 100 parts by weight of elastomer, of carbon black.

14. The hose of claim 1, where the thermoplastic fluoropolymer comprises a thermoplastic quadpolymers derived from i) tetrafluoroethylene, (ii) vinylidene fluoride, (iii) at least one ethylenically unsaturated monomer of the formula $CF_2=CFR_f$ where $R_f$ is a perfluoroalkyl or a perfluoroalkoxy of 1 to 8 carbon atoms, and (iv) a perfluorovinyl ether of the formula $CF_2=CF-(OCF_2\ CF(R_f))_a\ OR'_f$ where $R_f$ is as described in (iii), $R'_f$ is a perfluoroaliphatic, a perfluoroalkyl or a perfluoroalkoxy, of 1 to 8 carbon atoms, and a has a value of 0 to 3.

15. The hose of claim 14, wherein the thermoplastic fluoropolymer comprises a thermoplastic quadpolymers comprising (i) 40 to 80 weight percent tetrafluoroethylene, (ii) 10 to 30 weight percent vinylidene fluoride, (iii) 5 to 40 weight percent of a comonomer of the formula $CF_2=CFR_f$, and (iv) 0.1 to 15 weight percent of the perfluorovinyl ether of the formula $CF_2=CF-(OCF_2\ CF(R_f))_a\ OR'_f$.

16. A hose comprising
(A) a rubber layer comprising
  (1) 100 parts by weight of elastomer comprising a terpolymer of epichlorohydrin monomer, allyl glycidyl ether and ethylene oxide;
  (2) from about 10 to about 100 parts by weight, per 100 parts by weight of elastomer, of silica; and
  (3) from about 0.1 to about 1.8 parts by weight, per 100 parts by weight of elastomer, of first and second peroxides, wherein the 10 hour decomposition temperature of the first peroxide is greater than the 10 hour decomposition temperature of the second peroxide;
(B) a barrier layer adjacent to said rubber layer, said barrier layer comprised of thermoplastic terpolymer of tetrafluoroethylene, hexafluoropropylene and vinylidene fluoride comprising about 30–75 weight percent tetrafluoroethylene, about 5–40 weight percent hexafluoropropylene and about 5–55 weight percent vinylidene fluoride, with 100 weight percent of the monomer weight of the terpolymer made up from the combination of tetrafluoroethylene, hexafluoropropylene and vinylidene fluoride.

17. The hose of claim 16, wherein the first and second peroxides are selected from the group consisting of 1,1-ditert-butyl peroxy-3,3,5-trimethyl cyclohexane; n-butyl-4,4-bis(t-butyl peroxy)valerate; α,α'-bis(t-butylperoxy)-diisopropylbenzene; 2,5-dimethyl-2,5-(t-butyl peroxy)-hexane; and 2,5-dimethyl-2,5-di-(t-butylperoxy)hexyne-3.

18. A hose comprising
(A) a rubber layer comprising
  (1) 100 parts by weight of elastomer comprising a terpolymer of epichlorohydrin monomer, allyl glycidyl ether and ethylene oxide;
  (2) from about 10 to about 100 parts by weight, per 100 parts by weight of elastomer, of silica; and
  (3) from about 0.1 to about 1.8 parts by weight, per 100 parts by weight of elastomer, of at least one peroxide;
(B) a barrier layer adjacent to said rubber layer, said barrier layer comprised of a thermoplastic quadpolymer derived from i) tetrafluoroethylene, (ii) vinylidene fluoride, (iii) at least one ethylenically unsaturated monomer of the formula $CF_2=CFR_f$ where $R_f$ is a perfluoroalkyl or a perfluoroalkoxy of 1 to 8 carbon atoms, and (iv) a perfluorovinyl ether of the formula $CF_2=CF-(OCF_2\ CF(R_f))_a\ OR'_f$ where $R_f$ is as described in (iii), $R'_f$ is a perfluoroaliphatic, a perfluoroalkyl or a perfluoroalkoxy, of 1 to 8 carbon atoms, and a has a value of 0 to 3.

19. The hose of claim 18, wherein said at least one peroxide is selected from the group consisting of 1,1-ditertbutyl peroxy-3,3,5-trimethyl cyclohexane; n-butyl-4,4-bis(t-butyl peroxy)valerate; α,α'-bis(t-butylperoxy)-diisopropylbenzene; 2,5-dimethyl-2,5-(t-butyl peroxy)-hexane; and 2,5-dimethyl-2,5-di-(t-butylperoxy)hexyne-3.

20. A method of making a hose, said hose comprising
(A) a rubber layer comprising
  (1) 100 parts by weight of elastomer comprising epichlorohydrin rubber; and
  (2) from about 10 to about 100 parts by weight, per 100 parts by weight of elastomer, of silica; and
(B) a barrier layer adjacent to said rubber layer, said barrier layer comprised of at least one thermoplastic fluoropolymer;
the method comprising the step of
  curing the rubber layer with from about 0.1 to about 1.8 parts by weight, per 100 parts by weight of elastomer, of at least one peroxide, wherein said at least one peroxide comprises first and second peroxides, wherein the 10 hour decomposition temperature of the first peroxide is greater than the 10 hour decomposition temperature of the second peroxide.

* * * * *